United States Patent
Kulkarni et al.

(10) Patent No.: US 9,102,015 B2
(45) Date of Patent: Aug. 11, 2015

(54) METHOD AND APPARATUS FOR FABRICATION AND REPAIR OF THERMAL BARRIERS

(71) Applicants: Anand A. Kulkarni, Oviedo, FL (US); Ahmed Kamel, Orlando, FL (US); Stefan Lampenscherf, Poing (DE); Jonathan E. Shipper, Jr., Orlando, FL (US); Cora Schillig, Orlando, FL (US); Gary B. Merrill, Orlando, FL (US)

(72) Inventors: Anand A. Kulkarni, Oviedo, FL (US); Ahmed Kamel, Orlando, FL (US); Stefan Lampenscherf, Poing (DE); Jonathan E. Shipper, Jr., Orlando, FL (US); Cora Schillig, Orlando, FL (US); Gary B. Merrill, Orlando, FL (US)

(73) Assignee: Siemens Energy, Inc, Orlando, FL (US)

( * ) Notice: Subject to any disclaimer, the term of this patent is extended or adjusted under 35 U.S.C. 154(b) by 0 days.

(21) Appl. No.: 13/827,233

(22) Filed: Mar. 14, 2013

(65) Prior Publication Data

US 2014/0263579 A1 Sep. 18, 2014

(51) Int. Cl.

| B23K 31/02 | (2006.01) |
|---|---|
| B23K 10/00 | (2006.01) |
| B23P 6/00 | (2006.01) |
| B23K 1/00 | (2006.01) |

(Continued)

(52) U.S. Cl.
CPC ............. *B23P 6/005* (2013.01); *B22F 3/105* (2013.01); *B22F 5/009* (2013.01); *B22F 5/04* (2013.01); *B22F 7/02* (2013.01); *B22F 7/06* (2013.01); *B22F 7/062* (2013.01); *B23K 1/008* (2013.01); *B23K 1/0012* (2013.01); *B23K 1/0018* (2013.01); *B23K 35/02* (2013.01); *B23K 35/0222* (2013.01); *B23K 35/0244* (2013.01); *B23K 35/304* (2013.01); *B23K 35/3033* (2013.01); *C23C 26/00* (2013.01); *F01D 11/08* (2013.01); *F01D 11/122* (2013.01); *B23K 2201/001* (2013.01); *F05B 2230/80* (2013.01); *F05B 2230/90* (2013.01); *F05D 2230/30* (2013.01); *F05D 2230/80* (2013.01); *F05D 2240/11* (2013.01); *Y10T 428/24612* (2015.01)

(58) Field of Classification Search
CPC .......... B22F 5/04; B22F 2202/13; B22F 7/06; B22F 7/062; B23K 1/0012; B23K 1/0018; B23K 1/008; B23K 35/02; B23K 35/0222
USPC .......................................... 228/227, 228, 230
See application file for complete search history.

(56) References Cited

U.S. PATENT DOCUMENTS

| 4,124,732 A | 11/1978 | Leger | |
|---|---|---|---|
| 5,174,953 A * | 12/1992 | Albain et al. | 419/38 |

(Continued)

FOREIGN PATENT DOCUMENTS

| DE | 19963714 A1 | 7/2001 |
|---|---|---|
| DE | 10212106175 A1 | 1/2013 |

(Continued)

*Primary Examiner* — Erin Saad

(57) ABSTRACT

A thermal barrier tile (34) with a braze layer (46) co-sintered to a ceramic layer (48) is brazed to a substrate (26) of a component for fabrication or repair of a thermal barrier coating (28) for example on a gas turbine ring segment (22, 24). The tile may be fabricated by disposing a first layer of a metal brazing material in a die case (40); disposing a second layer of a ceramic powder on the metal brazing material; and co-sintering the two layers with spark plasma sintering to form the co-sintered ceramic/metal tile. A material property of an existing thermal barrier coating to be repaired may be determined (90), and the co-sintering may be controlled (93) responsive to the property to produce tiles compatible with the existing thermal barrier coating in a material property such as thermal conductivity.

6 Claims, 7 Drawing Sheets

(51) Int. Cl.
  *B22F 7/06* (2006.01)
  *B23K 35/02* (2006.01)
  *B22F 5/04* (2006.01)
  *B22F 3/105* (2006.01)
  *B22F 5/00* (2006.01)
  *B23K 35/30* (2006.01)
  *C23C 26/00* (2006.01)
  *F01D 11/08* (2006.01)
  *F01D 11/12* (2006.01)
  *B22F 7/02* (2006.01)
  *B23K 1/008* (2006.01)

(56) References Cited

U.S. PATENT DOCUMENTS

| | | |
|---|---|---|
| 5,331,816 A | 7/1994 | Able et al. |
| 5,553,455 A | 9/1996 | Craig et al. |
| 6,210,812 B1 | 4/2001 | Hasz et al. |
| 6,384,365 B1 | 5/2002 | Seth et al. |
| 6,638,639 B1 | 10/2003 | Burke et al. |
| 6,641,907 B1 | 11/2003 | Merrill et al. |
| 6,703,137 B2 | 3/2004 | Subramanian |
| 7,128,850 B2 | 10/2006 | Duan et al. |
| 7,146,725 B2 | 12/2006 | Kottilingam et al. |
| 7,198,860 B2 | 4/2007 | Vance |
| 7,311,790 B2 | 12/2007 | Morrison et al. |
| 7,758,968 B2 | 7/2010 | Schmitz et al. |
| 7,871,716 B2 | 1/2011 | Vance |
| 8,172,519 B2 | 5/2012 | Jarrabet et al. |
| 8,221,825 B2 | 7/2012 | Reitz et al. |
| 8,357,454 B2 | 1/2013 | Kulkarni et al. |
| 2005/0249602 A1 | 11/2005 | Freling et al. |
| 2008/0280101 A1 | 11/2008 | Morrison et al. |
| 2009/0017260 A1 * | 1/2009 | Kulkarni et al. .............. 428/161 |
| 2010/0237134 A1 | 9/2010 | Bucci et al. |

FOREIGN PATENT DOCUMENTS

| | | |
|---|---|---|
| EP | 1744145 A2 | 12/2006 |
| EP | 2159460 A1 | 3/2010 |
| EP | 2196276 A1 | 6/2010 |
| WO | 2012120231 A1 | 9/2012 |
| WO | 2012122373 A1 | 9/2012 |

* cited by examiner

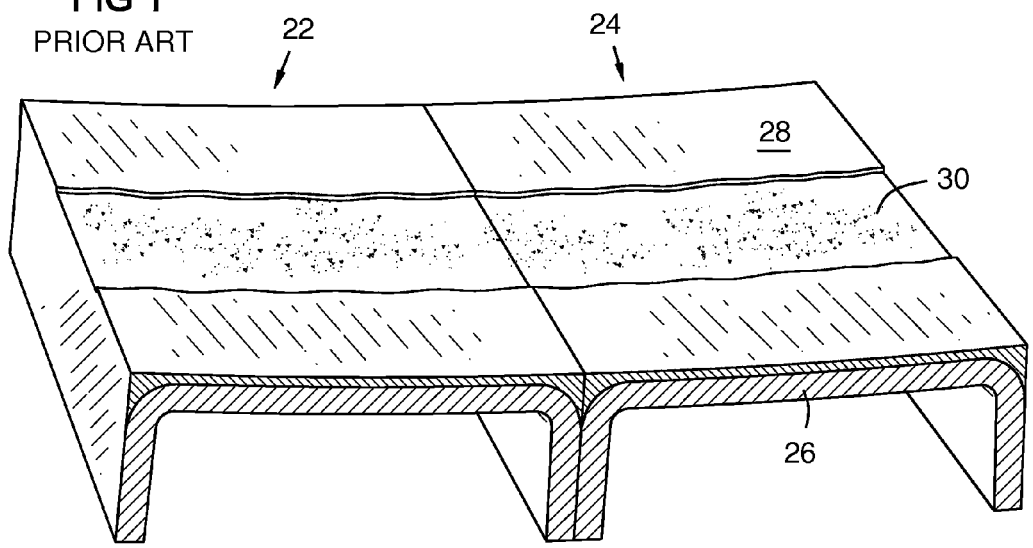
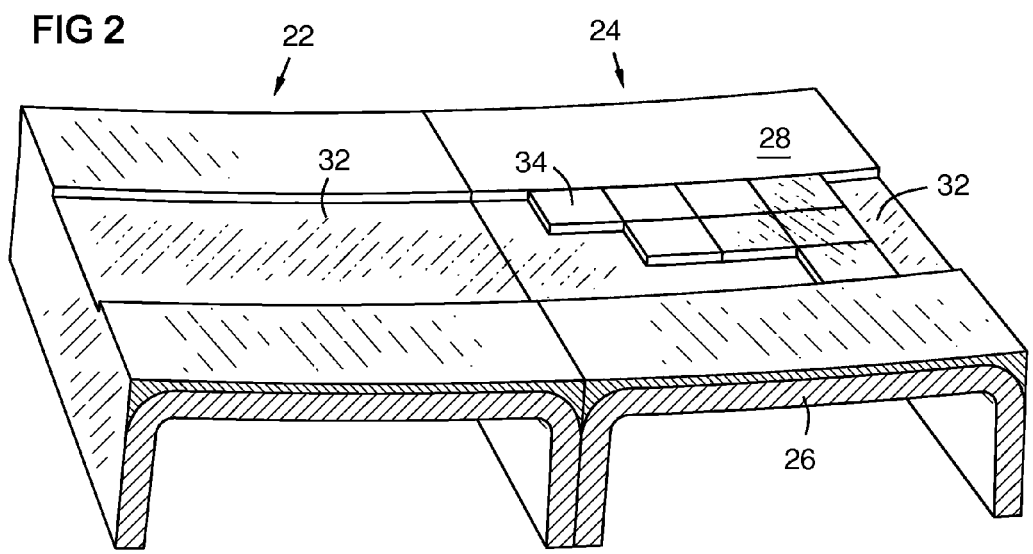

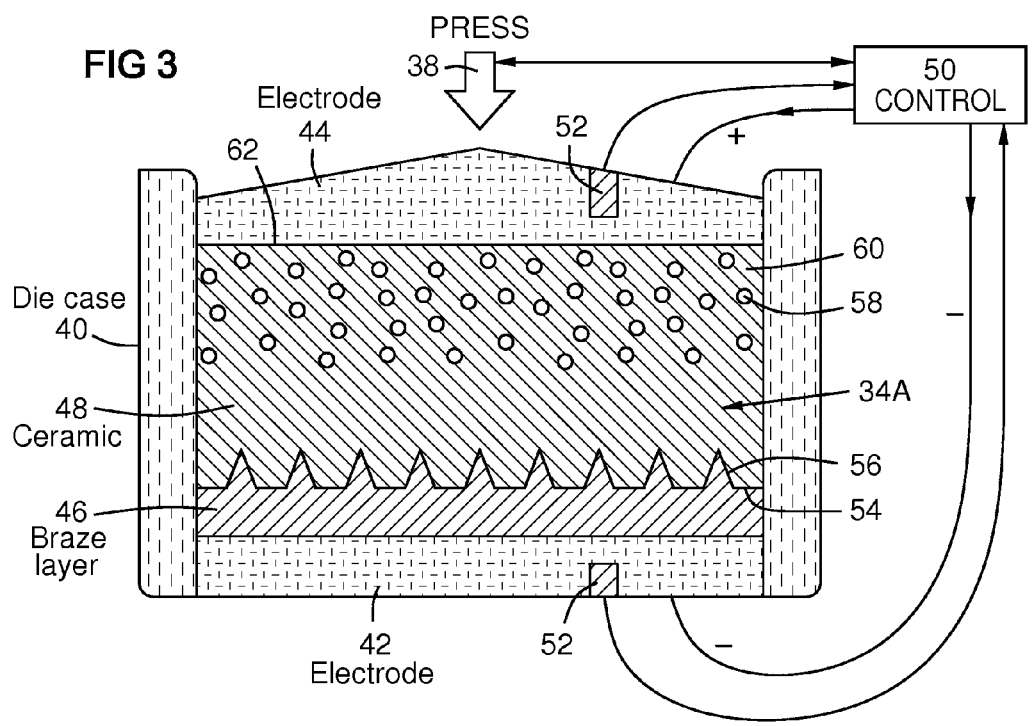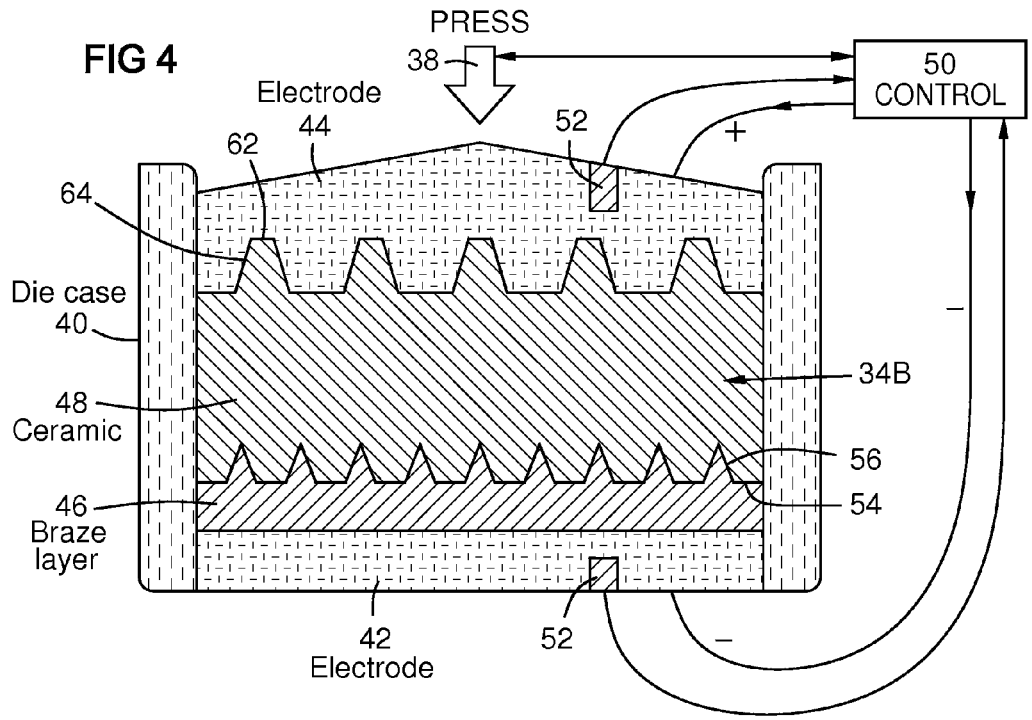

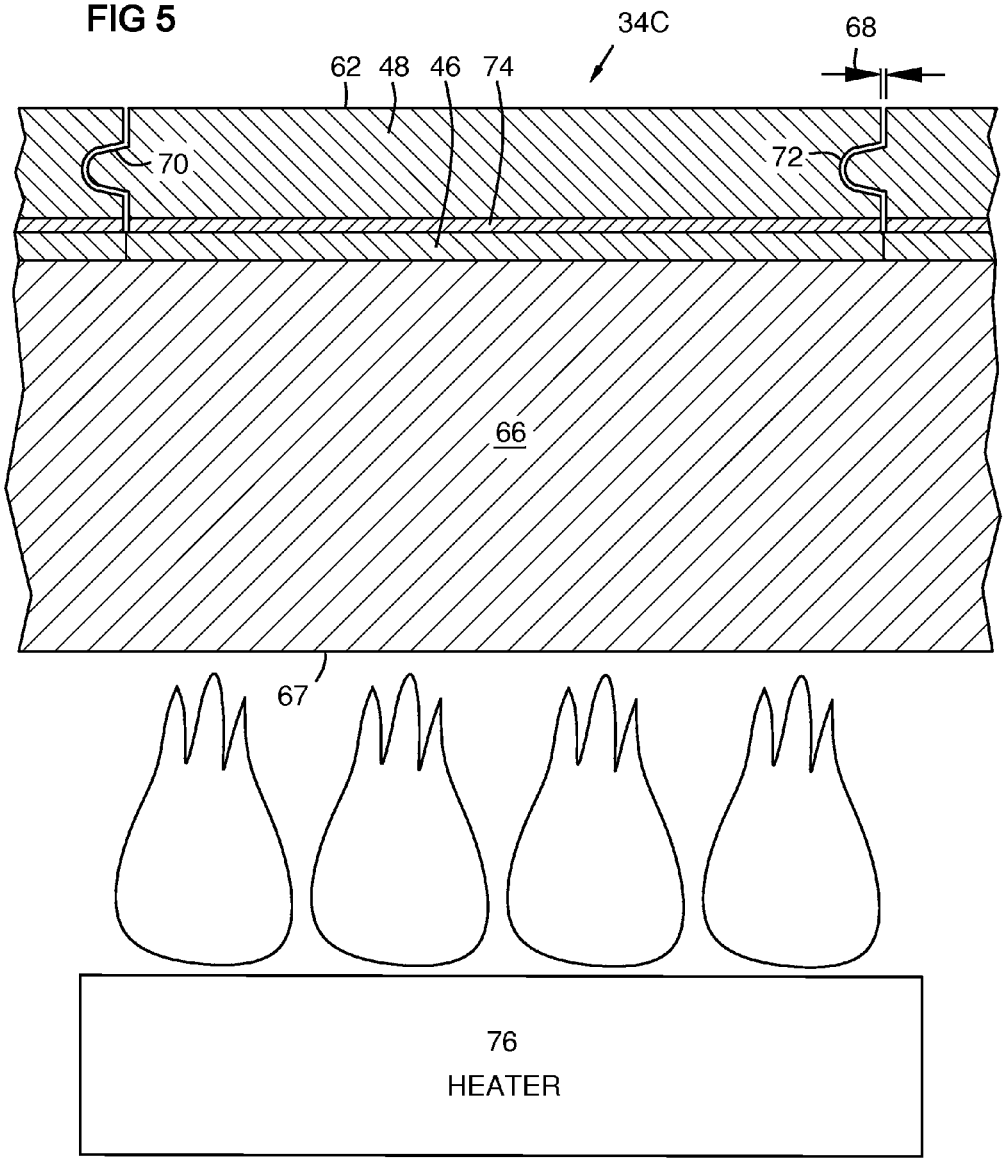

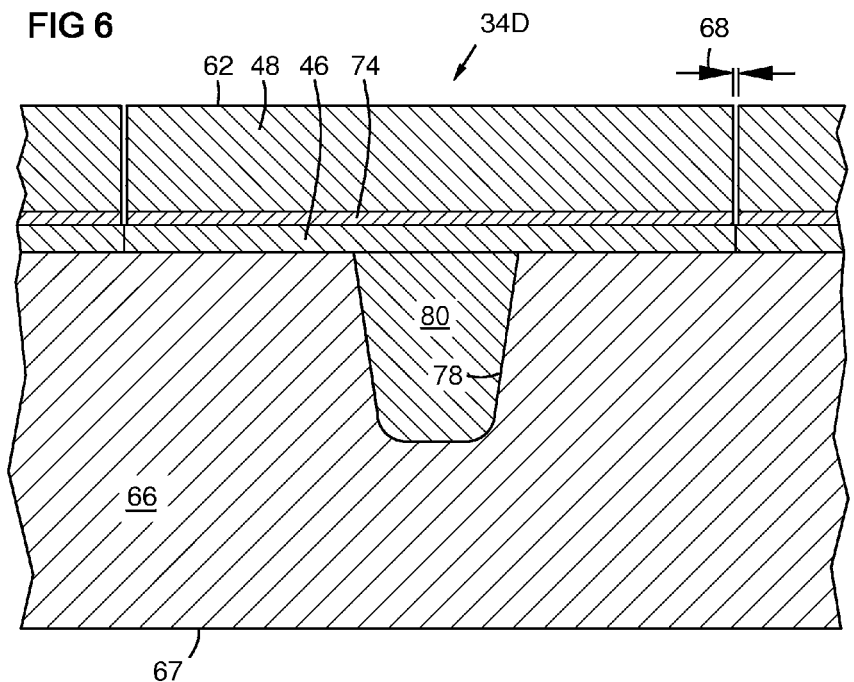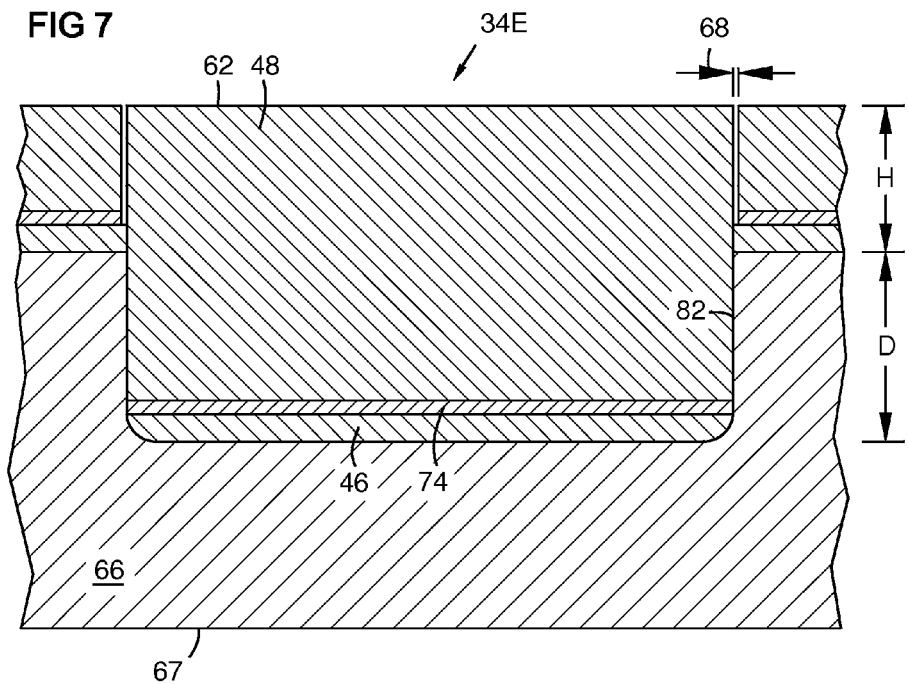

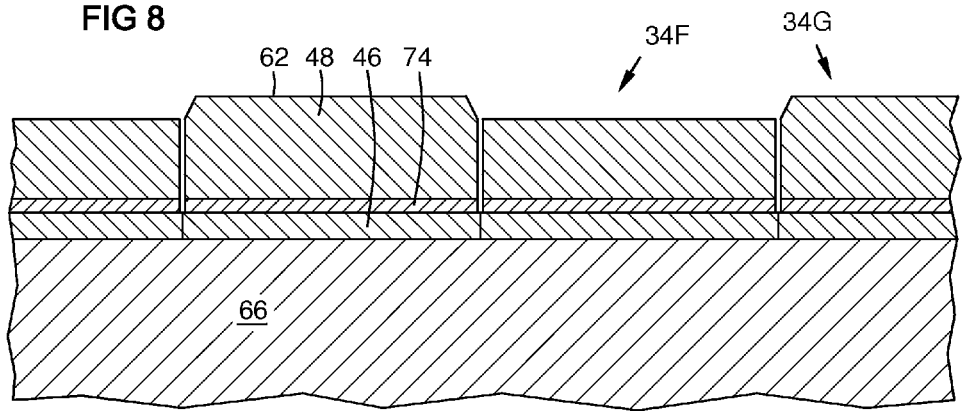
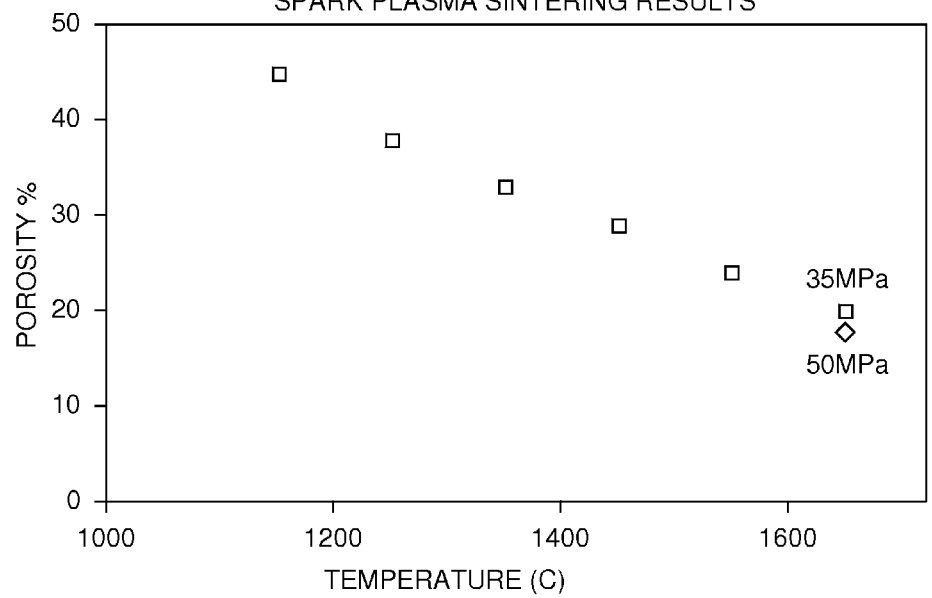

METHOD AND APPARATUS FOR FABRICATION AND REPAIR OF THERMAL BARRIERS

FIELD OF THE INVENTION

The invention relates generally to thermal barrier coatings, and in one embodiment, to the fabrication and repair of thermal barrier coatings on gas turbine engine components.

BACKGROUND OF THE INVENTION

The turbine section of a gas turbine engine contains a stationary shroud ring around each stage or row of rotating blades. A shroud ring has a sealing surface with close clearance to the blade tips to reduce inter-stage gas leakage past the turbine blade tips. The shroud ring is formed of curved segments called ring segments or blade outer air seals. Turbine blades and ring segments are commonly made of high temperature superalloys based on nickel, cobalt, or nickel-iron that maintain mechanical strength, creep resistance, surface stability, and corrosion/oxidation resistance at high temperatures. The sealing surface of each ring segment is typically coated with an oxidation resistant metallic bond coat and a thermally insulating ceramic thermal barrier coating (TBC). The outermost layer of the TBC is generally formed to be porous to make it abradable. When the metal turbine blade tips rub against the abradable coating, the blades cut a swath through the coating, thus enabling a minimal clearance between the blade tip and ring segment to minimize working gas leakage between turbine stages, thereby maximizing power output and fuel efficiency.

Abradable coatings are typically sprayed much thicker than other types of thermal barrier coatings. Extra thickness is required to allow the blade tips to cut into the coating. As thickness increases, strains increase in the coating from thermal gradients, especially during startup and shutdown of the engine. This can increase spalling of the coating causing loss of clearance control, which reduces engine power and efficiency. It also reduces thermal protection of the ring segment, reducing its service life. Another cause for spalling is increased hardness of the abradable coating through gradual sintering during engine operation.

When a thermal barrier coating has become degraded, it must be replaced or repaired to maintain engine efficiency. This is normally done by removing the ring segment to a repair facility, removing all of the old coating, and applying a new coating by known thermal spray methods. This is expensive, energy-intensive, and time-consuming. If the substrate is degraded by surface cracking as a result of the degraded thermal barrier coating, the ring segment may need to be replaced.

BRIEF DESCRIPTION OF THE DRAWINGS

The invention is explained in the following description in view of the drawings that show:

FIG. 1 is a perspective partly sectional view of two adjacent shroud ring segments with a blade tip swath in the thermal barrier coating as experienced in the prior art.

FIG. 2 is a perspective partly sectional view of two adjacent shroud ring segments with a portion of the worn TBC removed, and TBC tiles being installed.

FIG. 3 is a schematic sectional view of a fabrication apparatus for TBC tiles.

FIG. 4 shows another embodiment of a fabrication apparatus for TBC tiles.

FIG. 5 is a sectional view of interlocking TBC tiles brazed onto a substrate.

FIG. 6 is a sectional view of a TBC tile brazed over a substrate braze repair.

FIG. 7 is a sectional view of a TBC tile with extra depth brazed into a depression routed in the substrate for crack removal.

FIG. 8 is a sectional view of TBC tiles of different heights forming a wear surface patterned for abradability.

FIG. 9 is a graph of porosity versus sintering temperature for spark plasma sintering of an exemplary ceramic powder.

DETAILED DESCRIPTION OF THE INVENTION

Figure 10:
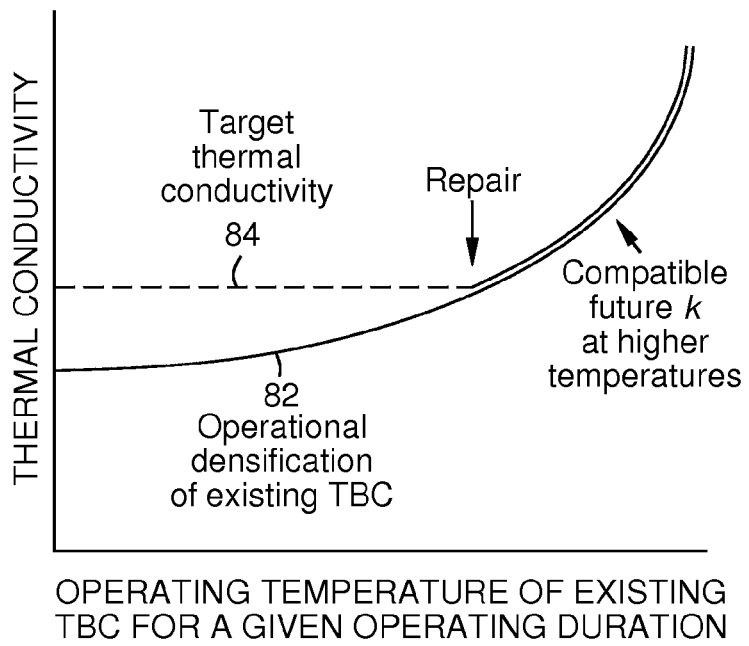
FIG. 10 is a graph for determining a target thermal conductivity for a thermal barrier tile.

The inventors realized that damage to a ring segment thermal barrier coating is often localized to particle impact points and to the spalled rub swath of the blade tip, and that localized repair could extend the life of the ring segment at minimal cost. An apparatus and method for accomplishing such a novel repair is disclosed herein.

FIG. 1 shows two adjacent shroud ring segments 22, 24. Each segment includes a substrate 26 and a thermal barrier coating (TBC) 28. A turbine blade tip swath 30 has been worn into the thermal barrier coating. This swath enlarges and degrades over time, resulting in loss of turbine efficiency due to the hot gas flowing over the tip of the blade rather than across its airfoil.

FIG. 2 shows the two adjacent shroud ring segments 22, 24 with a portion 32 of the worn TBC 28 encompassing the swath 30 of FIG. 1 removed down to the substrate 26. Thermal barrier tiles 34 are being installed as described herein. The surface of the substrate may be prepared for receiving the tiles 34 by material removal and cleaning methods such as routing, sanding, water-jet blasting, sand blasting, etching, etc.

FIG. 3 shows a fabrication apparatus for TBC tiles according to an embodiment of the invention. It includes a die case 40 with electrodes 42, 44. A layer 46 of a brazing material is deposited in the die case. This material may be in the form of a foil, a metal powder, or a metal powder preform. A second layer 48 of a ceramic powder or preform is deposited on the metal brazing material. Voltage +/− is applied across the materials to co-sinter the ceramic and the brazing materials by spark plasma sintering. The sintering voltage and duration may be controlled 50 to achieve a target temperature measured by thermometers 52. The layers 46, 48 may be compressed 38 during sintering. The sintering pressure, temperature, and duration may be controlled by a controller 50 to achieve a target density and/or other material properties as described herein.

The apparatus and process of FIG. 3 creates a thermal barrier tile 34A with an inner layer 46 of brazing material, an outer layer 48 of a ceramic material, and a co-sintered interface 54 between them. The interface may be formed with an interlocking structural pattern 56 for improved adhesion of the two layers. The interlocking pattern 56 may be formed by molding the braze material into a patterned low-temperature preform. For example, a braze layer preform may be made from braze powder with a polymer binder or by partial sintering. The preform may be shaped in a flexible mold such that the pattern 56 may have any desired complex shape including protruding undercuts that function to anchor the overlying ceramic layer 48. Then ceramic powder for layer 48 may be deposited on the patterned braze preform for final targeted sintering. Exemplary ceramic constituents are alumina and yttria stabilized zirconia. Other ceramic materials may be used as known in the art.

Braze materials lacking boron and instead containing titanium are beneficial, since boron promotes brittleness. Improved braze materials suitable for use with superalloy materials have been developed by the assignee of the present invention, such as the nickel-chromium-titanium based brazing alloys described in co-pending U.S. patent application Ser. No. 13/495,223 incorporated by reference herein. Those materials compare favorably in strength to previous braze materials, and they are strong enough to be considered a structural repair (i.e. at least 70% of the yield strength of the base metal).

A ternary braze alloy for such applications may have compositions within the following ranges (all compositions disclosed herein are in units of wt. %):
Cr 15-25%;
Ti 15-25%;
balance Ni.
Particular braze alloys within this group may have the following compositions: Cr 16.3%, Ti 21.2%, balance Ni; or Cr 17.2%, Ti 20.9%, balance Ni.

Other braze alloys that may be useful with the present invention may have compositions within the following ranges:
Cr 12-16%;
Ti 13-16%;
Al 0-2.5%;
Co 2-4%;
W 3-5%;
Mo 0-2%;
Ta 0-2%;
balance Ni.
A particular braze alloy within this group may have the following composition: Cr 14.1%, Ti 14%, Al 2.1%, Co 3.1%, W 4.1%, Mo 1%, Ta 1%, balance Ni.

Other braze alloys may have compositions within the following ranges:
Cr 15-18%;
Ti 10-15%;
Al 0-2.5%;
Co 2-4%;
W 3-5%;
Mo 0-2%;
Ta 0-2%;
balance Ni.
A particular braze alloy within this group may have the following composition: Cr 17.57%, Ti 13.54%, Al 2.39%, Co 3.24%, W 3.47%, Mo 1.15%, Ta 0.83%, balance Ni.

Other braze alloys may have compositions within the following ranges:
Cr 15-19%;
Ti 8-10%;
Al 0-2.5%;
Co 14-18%;
Mo 12-16%;
balance Ni.
A particular braze alloy within this group may have the following composition: Cr 15.12%, Ti 10%, Al 2.12%, Co 15.8%, Mo 12.97%, balance Ni.

Other braze alloys may have compositions within the following ranges:
0-2.5% Al;
14-18% Co;
15-19% Cr;
12-16% Mo;
8-10% Ti;
balance Ni.

Porosity may be formed in the ceramic layer 48 by inclusion of hollow ceramic spheres 58 or particles of a fugitive material to increase abradability and insulation. The porosity may be graded across a thickness of the tile, such as the tile having a greater porosity proximate its top surface and a lower porosity proximate the interface 54 with the braze layer 46. Increased porosity toward the top surface 62 of the tile minimizes blade tip wear. Decreased porosity toward the bottom of the tile maximizes impact and spallation resistance. Gradient porosity may be achieved by layered deposition of varying proportions of ceramic powder and inclusions. Each sub-layer may be solidified with a binder or by partial sintering to maintain the gradient during the final sintering. When spheres 58 are used, the material of the ceramic layer 48 acts as a matrix 60.

FIG. 4 shows an embodiment in which a pattern 64 is formed on the top surface 62 of a thermal barrier tile 34B for increased abradability and reduced blade wear. The pattern may take the form of ridges and depressions. The depressions may be discontinuous and the ridges may be continuous to minimize gas leakage around the blade tip through the depressions. Such a pattern may be provided instead of, or in addition to, porosity by inclusions as previously described.

FIG. 5 shows an embodiment of thermal barrier tiles 34C mounted on a substrate 66. Opposed edges 70, 72 of the tiles may be contoured to reduce gas and heat flow into the gaps 68 between tiles. For example, each tile may have a first non-planar side surface 70 on a first side of the ceramic layer 48, and a second non-planar side surface 72 on a second side of the ceramic layer opposed the first side, the shapes of the first and second non-planar side surfaces 70, 72 being complementary mirror images such that when a pair of such thermal barrier tiles are disposed side-by-side, the tiles interlock along an axis perpendicular to the surface of the substrate 66. Tile edges may be shaped and angled generally to compensate for curvature of the substrate, so that the gaps 68 are uniform throughout the depth of the ceramic layer 48.

Brazing may be done heating 76 in an oven or locally, for example on the backside 67 of the substrate 66 as shown in FIG. 5. This melts the braze layer 46, which bonds the tiles to the substrate and merges the braze layers of adjacent tiles. A benefit of a tiled thermal barrier over a monolithic one is that the gaps 68 between the tiles provide stress relief in the thermal barrier during thermal cycling, delaying degradation of the thermal barrier and substrate.

An optional bond layer 74 may be added between the braze layer 46 and the ceramic layer 48 to improve bonding, especially when the ceramic layer 48 and the substrate 66 have substantially different coefficients of thermal expansion. An exemplary bond material is an MCrAlY alloy, where M is selected from Ni, Co, Fe and their mixtures, and Y can include yttrium Y, as well as La and Hf. The bond layer 74 may be deposited and formed into the tile in the die case 40 in the spark plasma sintering process described above.

Spark plasma sintering (SPS) can be performed on metal powders and on both electrically conductive and non-conductive ceramic powders. The heat is generated internally, so it does not need time to migrate inward from the surfaces of the powder compact or die. Thus, sintering is very fast, uniform, and efficient. Heating rates up to about 1000 K/min are possible. Because of its uniformity and speed, SPS can densify nano-sized and mixed-size powders without the coarsening that occurs with other sintering methods. SPS saves energy and material compared to other methods. Thermal spray often produces only 10-15% deposition efficiency, wasting most of the expensive feedstock material. SPS also eliminates most fumes of thermal spray, thus minimizing environmental impacts and operator health hazards. Therefore, producing and/or repairing thermal barrier coatings as described herein saves money, time, and environmental impacts. It also makes on-site repair more practical, since the pre-fabricated tiles simply need to be brazed onto a prepared surface, not requiring on-site spray equipment, spray enclosures, powder stock, or air filtration systems.

FIG. 6 shows a tile 34D mounted over a substrate repair, in which a crack in the substrate has been removed by routing a groove 78 that follows and removes the crack. The term "routing" herein includes material removal with a rotating bit or other means, such as water jet blasting or sand blasting. The groove is then filled with a braze filler material 80, which may be the same or similar to the material used for the braze layer 46, and may be a structural braze material as described above. Heating melts the braze filler 80 and the braze layer 46, filling the crack and bonding the tile, thus accomplishing both the repair operation and the re-coating operation into the same step.

FIG. 7 shows a tile 34E mounted over a substrate repair, in which a crack or other degradation of the substrate has been removed by routing a depression 82 that removes the crack. The tile 34E is formed with a thickness H+D that compensates for the depth of the depression D in relation to a desired height H of the thermal barrier coating. Tiles of standardized dimensions may be prepared in advance, and the substrate may be prepared by removing material to form a depression 82 responsive to the standardized dimensions.

FIG. 8 shows a thermal barrier formed of a plurality of thermal barrier tiles 34F, 34G of different respective heights arranged to form a surface pattern for increased abradability. The tiles may be arranged in a checkerboard pattern for example or in other patterns such as ridges and depressions.

FIG. 9 shows a graph of porosity versus sintering temperature for spark plasma sintering (SPS) of an yttria stabilized zirconia powder with a particle size of 20-95 micrometers. Two powder compression options are illustrated for the last data point. This graph illustrates a type of function that can be employed to produce a target porosity in a tile.

Overall porosity is a combination of the ceramic density and the void fraction from inclusions, if any. The ceramic powder may be mixed with particles of fugitive material such as a polymer to achieve a predetermined porosity after sintering to a given temperature. Alternately, hollow ceramic spheres (58, FIG. 3) may be mixed with the ceramic powder. If the spheres are fully sintered before mixing, the void fraction is established mainly by the sphere geometry and the proportion of spheres in the mixture. The density of the ceramic matrix (60, FIG. 3) may be determined by a sintering temperature to meet a target ceramic density, overall ceramic layer density, and/or other material property such as thermal conductivity as described herein.

FIG. 10 is a graph for determining a target thermal conductivity 84 for a thermal barrier tile. A thermal barrier coating on a turbine component densifies 82 over time as a function of temperature. At maintenance intervals, the thermal conductivity of the existing TBC can be estimated by such a function. Alternately, components with degraded TBCs can be removed and tested for such material properties. Thermal barrier tiles 34, 34A-F as described herein can then be fabricated responsive to material properties of the existing TBC, so that the property of the tiles used for a repair is compatible with the remaining existing TBC. "Compatible" means the tile matches one or more material properties of the existing TBC within a given tolerance such as 10% over an expected range of operating temperatures and time. Such matching of repair tiles to the characteristics of the remaining TBC will minimize stress induced in the repaired component once it is placed back into service. Graphs of spark plasma sintering results, such as in FIG. 9 can be used to control (50, FIG. 3) sintering temperature, time, and compression to meet such material compatibility targets. With a graph such as FIG. 10, a material property of a TBC on a given component in a gas turbine can be estimated for example after 2000 or 3000 operating hours based on the known operating temperature(s) of that component.

Figure 11:
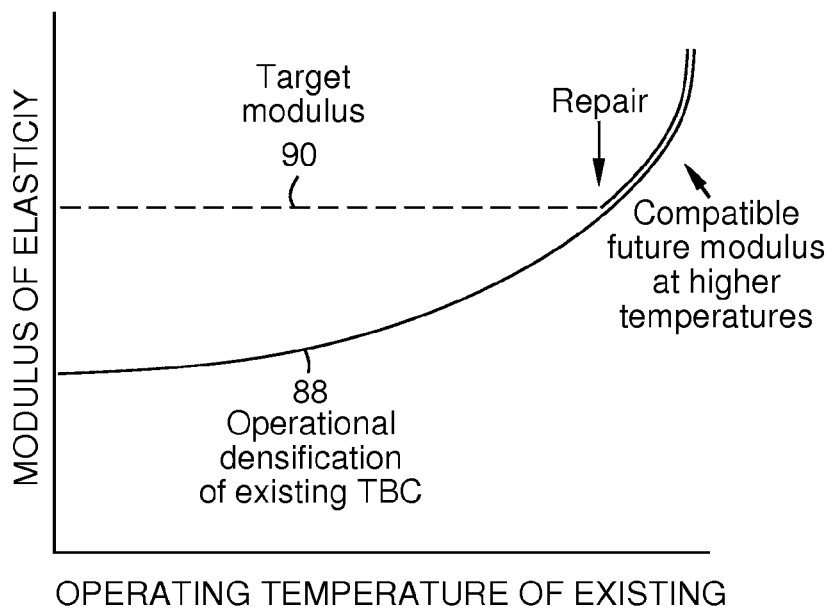
FIG. 11 is a graph for determining a target modulus of elasticity for a thermal barrier tile.

FIG. 11 is a graph for determining a target thermal modulus of elasticity 90 for a thermal barrier tile. A thermal barrier coating on a turbine component densifies 88 over time as a function of temperature, becoming more rigid and brittle. The modulus of elasticity of the existing TBC 28 can be determined or estimated based on temperature and operating duration to provide a target modulus of elasticity for the repair tile 34.

Figure 12:
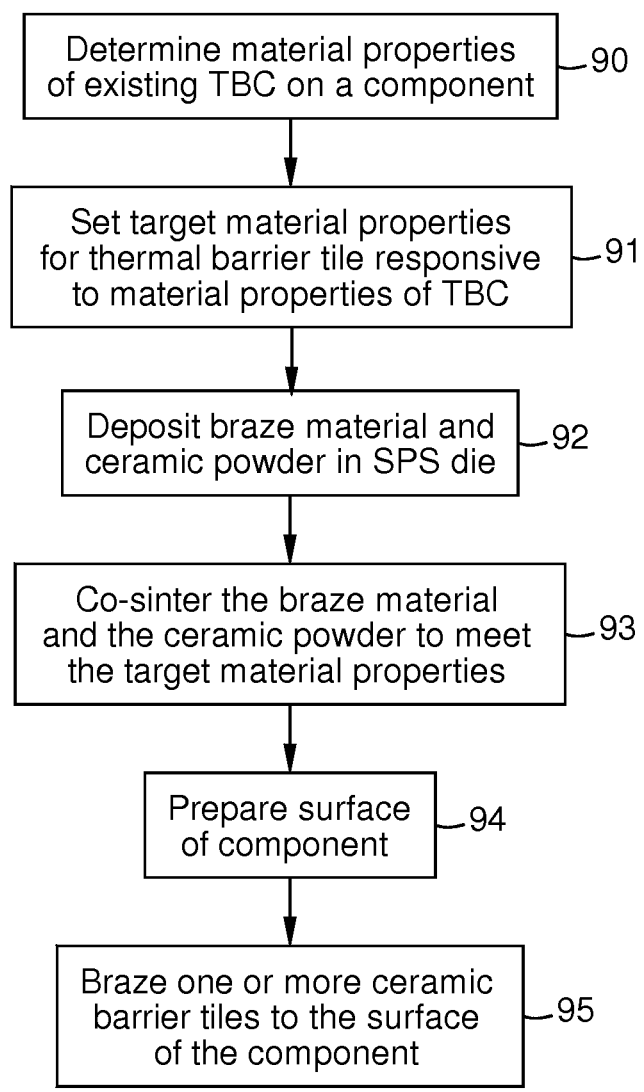
FIG. 12 illustrates a method of an embodiment of the invention.

FIG. 12 illustrates steps 90-95 in a method of an embodiment of the invention. Replacement tiles may be made with the same ceramic materials and porosities as the existing TBC. However, this is not essential as long as at least one material property of the tiles is compatible with the existing TBC and the tile abradability is suitable. A material property may be for example thermal conductivity, modulus of elasticity, or coefficient of thermal expansion. Replacement tiles may in some cases use different materials from the existing TBC to take advantage of advances in materials science. Abradability can be adjusted in part by the degree of sintering and in part by the ceramic layer structure, including surface patterns and voids formed by inclusions.

Thermal tiles as described herein may also be used to create new thermal barriers during manufacturing of components or for complete replacement of an existing TBC. In such cases, matching of material properties with an existing TBC may not be necessary. Ceramic grout may be used between tiles, but is not needed or recommended in most applications, since segmentation is beneficial in reducing stress in the thermal barrier.

Benefits of thermal barrier tiles as described herein over conventional thermal spraying of a thermal barrier coating include:
  Segmentation of thermal barrier relieves stress therein.
  Eliminates material and energy waste of thermal spray.
  Eliminates fumes of thermal spray.
  Tighter control of material properties of the thermal barrier.
  Allows localized repair of TBC and substrate.
  Makes on-site repair more practical, since the thermal barrier is pre-fabricated, and only surface preparation and brazing are needed.
  Customized depth of tiles for removing cracks in substrate.
  Allows spark plasma sintering to be used, which provides uniform, fast sintering to specific target material properties.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for fabricating a thermal barrier of a gas turbine component, comprising:
   determining at least one material property of an existing thermal barrier coating on the component, the material property selected from the group consisting of modulus of elasticity, thermal conductivity, and coefficient of thermal expansion, wherein a value of said at least one material property is determined as a function of operating temperature and operating duration of the existing thermal barrier coating; and
   disposing a first layer of a metal brazing material in a die case;
   disposing a second layer of a ceramic material on the metal brazing material; and
   co-sintering the first and second layers in the die case with spark plasma sintering to form a co-sintered ceramic/metal tile comprising a metal brazing layer, a ceramic thermal barrier layer, and a co-sintered interface there between; and
   controlling the co-sintering to make the ceramic/metal tile to match the value of said at least one material property within 10% over an expected range of operating temperatures and time.

2. The method of claim 1, further comprising forming a predetermined porosity in the ceramic layer by preparing a preform of the ceramic material prior to the disposing of the second layer of the ceramic material on the metal brazing material, wherein the ceramic preform comprises inclusions that produce the porosity after the co-sintering.

3. The method of claim 1, further comprising forming the co-sintered interface with an interlocking structural pattern.

4. The method of claim 3, further comprising molding the brazing material into a patterned preform with the interlocking structural pattern thereon before the disposing of the second layer thereon.

5. The method of claim 1, further comprising making the metal brazing material of Cr 15-25 wt %, Ti 15-25 wt %, and the balance Ni.

6. The method of claim 1, further comprising making the metal brazing material of Cr 12-16 wt %; Ti 13-16 wt %; Al 0-2.5 wt %; Co 2-4 wt %; W 3-5 wt %; Mo 0-2 wt %; Ta 0-2 wt %; and the balance Ni.

* * * * *